United States Patent
Yang et al.

(10) Patent No.: US 12,520,288 B2
(45) Date of Patent: Jan. 6, 2026

(54) METHOD FOR COMMUNICATION PROCESSING, TERMINAL DEVICE, AND NON-TRANSITORY COMPUTER-READABLE STORAGE MEDIUM

(71) Applicant: UNISOC(CHONGQING) TECHNOLOGIES CO., LTD., Chongqing (CN)

(72) Inventors: Jiang Yang, Chongqing (CN); Lijun Huang, Chongqing (CN); Cui He, Chongqing (CN); Xu Zou, Chongqing (CN)

(73) Assignee: UNISOC(CHONGQING) TECHNOLOGIES CO., LTD., Chongqing (CN)

( * ) Notice: Subject to any disclaimer, the term of this patent is extended or adjusted under 35 U.S.C. 154(b) by 354 days.

(21) Appl. No.: 18/251,139

(22) PCT Filed: Oct. 22, 2021

(86) PCT No.: PCT/CN2021/125667
§ 371 (c)(1),
(2) Date: Apr. 28, 2023

(87) PCT Pub. No.: WO2022/089313
PCT Pub. Date: May 5, 2022

(65) Prior Publication Data
US 2023/0413247 A1 Dec. 21, 2023

(30) Foreign Application Priority Data
Oct. 30, 2020 (CN) .......................... 202011192238.0

(51) Int. Cl.
*H04W 72/0446* (2023.01)
*H04W 72/1273* (2023.01)
*H04W 72/53* (2023.01)

(52) U.S. Cl.
CPC ... *H04W 72/0446* (2013.01); *H04W 72/1273* (2013.01); *H04W 72/53* (2023.01)

(58) Field of Classification Search
CPC ......... H04W 72/0446; H04W 72/1273; H04W 72/53
See application file for complete search history.

(56) References Cited

U.S. PATENT DOCUMENTS

| 2015/0282019 A1* | 10/2015 | Anand ................. | H04W 24/10 455/437 |
| 2020/0169858 A1* | 5/2020 | Hu ....................... | H04W 8/183 |
| 2022/0117018 A1* | 4/2022 | Gu ....................... | H04W 8/183 |

FOREIGN PATENT DOCUMENTS

| CN | 103283290 A | 9/2013 |
| CN | 104113937 A | 10/2014 |

(Continued)

OTHER PUBLICATIONS

1 The extended European search report issued in corresponding EP application No. 21885040.2 dated Mar. 21, 2024.

(Continued)

*Primary Examiner* — Brian P Cox
(74) *Attorney, Agent, or Firm* — Raj S. Dave; Dave Law Group, LLC (57) ABSTRACT

A method for communication processing is provided. The method is applicable to a terminal device, where the terminal device is provided with a first subscriber identity module (SIM) card and a second SIM card. The first SIM card and the second SIM card multiplex a hardware resource of the terminal device in a time-division manner. The method includes: obtaining a reception occasion for execution of a non-connected-state service via the second SIM card, when the first SIM card is in a connected state and the second SIM card is in a non-connected state; and determining a connected-state-service gap according to the reception occasion. The terminal device is allowable to execute a connected-state service via the first SIM card in the connected-state-service gap.

16 Claims, 5 Drawing Sheets

(56) References Cited

FOREIGN PATENT DOCUMENTS

| | | |
|---|---|---|
| CN | 111278106 A | 6/2020 |
| CN | 111294986 A | 6/2020 |
| CN | 111491310 A | 8/2020 |
| CN | 111555825 A | 8/2020 |
| EP | 2466984 A1 | 6/2012 |
| EP | 2472973 A1 | 7/2012 |
| EP | 3982696 A1 | 4/2022 |
| WO | 2013174224 A1 | 11/2013 |
| WO | 2018176675 A1 | 10/2018 |

OTHER PUBLICATIONS

WIPO, International Search Report and Written Opinion for International Application No. PCT/CN2021/125667, Jan. 26, 2022.
LG Electronics, RAN2 aspects in SIM Switching, R2-2010286, 3GPP TSG-RAN WG2 Meeting #112-e, Oct. 23, 2020.
Fu Hao, et al. Analysis on China Telecom 4G Terminal with Dual SIM Card, Feb. 28, 2015.
The first office action issued in corresponding CN application No. 202011192238.0 dated Jun. 22, 2022.
Notice of allowance issued in corresponding CN application No. 202011192238.0 dated Jan. 11, 2023.

\* cited by examiner

METHOD FOR COMMUNICATION PROCESSING, TERMINAL DEVICE, AND NON-TRANSITORY COMPUTER-READABLE STORAGE MEDIUM

CROSS-REFERENCE TO RELATED APPLICATION(S)

This application is a National Stage of International Application No. PCT/CN2021/125667, filed on Oct. 22, 2021, which claims priority to Chinese Patent Application No. 202011192238.0, filed on Oct. 30, 2020, both of which are incorporated herein by reference in their entireties.

TECHNICAL FIELD

This disclosure relates to the field of communication, and in particular, to a method for communication processing, a terminal device, and a non-transitory computer-readable storage medium.

BACKGROUND

With the development of mobile communication technologies, terminal devices configured with two subscriber identity module (SIM) cards are increasingly popular. At present, two SIM cards configured for the terminal device usually share one set of hardware resources of the terminal device. In the case where the terminal device needs to execute a non-connected-state service via an SIM card in a non-connected state when the terminal device executes a connected-state service via an SIM card in a connected state, the SIM card in the connected state needs to be punctured for autonomous-gap allocation, so that the terminal device can execute the non-connected-state service via the SIM card in the non-connected state. In such connected-state-service-based manner for autonomous-gap allocation, a reception occasion for the non-connected-state service is required to be known in advance. However, the reception occasion for the non-connected-state service is flexible and variable, resulting in an inaccurate autonomous gap allocated through puncturing, and thus unnecessarily interrupting the connected-state service. Furthermore, a duration of an autonomous gap allocated is fixed, resulting in that the autonomous gap cannot be released in advance in the case where the non-connected-state service has been completed in advance in a corresponding reception occasion, and thus prolonging a duration of interruption of the connected-state service.

SUMMARY

A method for communication processing, a terminal device, and a non-transitory computer-readable storage medium are provided in implementations of the disclosure.

In a first aspect, a method for communication processing is provided in implementations of the disclosure. The method is applicable to a terminal device, where the terminal device is provided with a first subscriber identity module (SIM) card and a second SIM card. The first SIM card and the second SIM card multiplex a hardware resource of the terminal device in a time-division manner. The method includes: obtaining a reception occasion for execution of a non-connected-state service via the second SIM card, when the first SIM card is in a connected state and the second SIM card is in a non-connected state; and determining a connected-state-service gap according to the reception occasion. The terminal device is allowable to execute a connected-state service via the first SIM card in the connected-state-service gap.

In a second aspect, a terminal device is provided in implementations of the disclosure. The terminal device is provided with a first SIM card and a second SIM card. The first SIM card and the second SIM card multiplex a hardware resource of the terminal device in a time-division manner. The terminal device includes a processor and a memory storing a computer program which, when executed by the processor, causes the terminal device to obtain a reception occasion for execution of a non-connected-state service via the second SIM card, when the first SIM card is in a connected state and the second SIM card is in a non-connected state, and determine a connected-state-service gap according to the reception occasion. The terminal device is allowable to execute a connected-state service via the first SIM card in the connected-state-service gap.

In a third aspect, a non-transitory computer-readable storage medium is further provided in implementations of the disclosure. The computer-readable storage medium is configured to store computer programs which enable a terminal device to obtain a reception occasion for execution of a non-connected-state service via the second SIM card, when the first SIM card is in a connected state and the second SIM card is in a non-connected state, and determine a connected-state-service gap according to the reception occasion. The terminal device is allowable to execute a connected-state service via the first SIM card in the connected-state-service gap.

BRIEF DESCRIPTION OF THE DRAWINGS

To describe technical solutions in implementations of the disclosure more clearly, the following will give a brief introduction to accompanying drawings required for describing implementations. Apparently, the accompanying drawings hereinafter described merely illustrate some implementations of the disclosure. Based on these drawings, those of ordinary skills in the art can also obtain other drawings without creative effort.

DETAILED DESCRIPTION

The following will illustrate clearly and completely technical solutions of implementations of the disclosure with reference to accompanying drawings of implementations of the disclosure. Apparently, implementations illustrated herein are merely some, rather than all implementations, of the disclosure. Based on the implementations of the disclosure, all other implementations obtained by those of ordinary skill in the art without creative effort shall fall within the protection scope of the disclosure.

It needs to be noted that the terms "first", "second", and the like used in the specification, the claims, and the accompany drawings of the disclosure are used to distinguish similar objects rather than used to describe a particular order or a sequence. It can be understood that the data used is interchangeable at appropriate situations, so that the implementations of the disclosure described herein can be implemented in an order other than an order illustrated or described herein. In addition, the terms "include", "comprise", and "have" as well as variations thereof are intended to cover non-exclusive inclusion. For example, a process, method, system, product, or server including a series of steps or units is not limited to the clearly listed steps or units, it can optionally include other operations or units that are not clearly listed; alternatively, other operations or units inherent to the process, method, product, or device can be included either.

Figure 1:
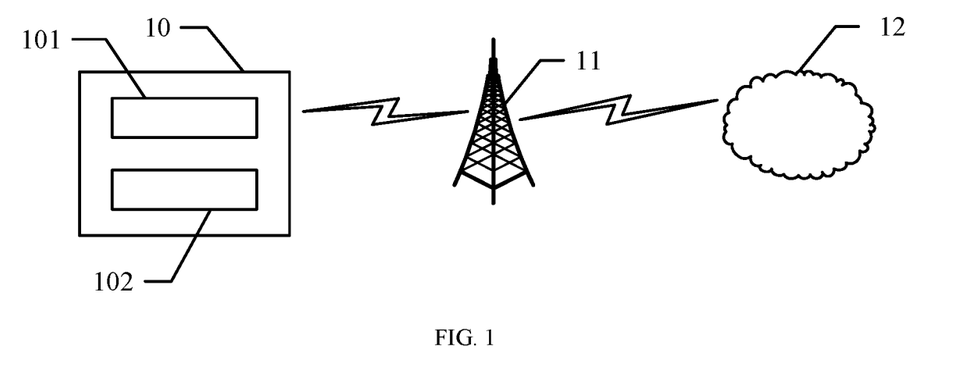
FIG. 1 is a scenario diagram of a method for communication processing provided in implementations of the disclosure.

Referring to FIG. 1, FIG. 1 is a scenario diagram of a method for communication processing provided in implementations of the disclosure. Specifically, as illustrated in FIG. 1, in the scenario, a terminal device 10 is provided with a first subscriber identity module (SIM) card 101 and a second SIM card 102. The first SIM card 101 and the second SIM card 102 can multiplex a hardware resource of the terminal device 10 in a time-division manner, i.e., the first SIM card 101 and the second SIM card 102 can use the same set of hardware resources of the terminal device 10 at different times. When the first SIM card 101 is in a connected state and the second SIM card 102 is in a non-connected state, the first SIM card 101 is allowable to execute a connected-state service. For example, the terminal device 10 executes a packet switching (PS) service with a base station 11 via the first SIM card 101, so that a data service between the terminal device 10 and a data network 12 is realized. The second SIM card 102 is allowable to execute a non-connected-state service such as paging reception, system information (SI) reception, signal measurement, or cell search.

In implementations of the disclosure, when the first SIM card 101 is in the connected state and the second SIM card 102 is in the non-connected state, the terminal device 10 allocates a connected-state-service gap to the first SIM card 101 according to a reception occasion for the non-connected-state service.

For example, on condition that the terminal device 10 detects a trigger event for execution of the non-connected-state service, such as receiving an instruction for execution of cell measurement transmitted by a network side, a reception occasion closest to a time at which the trigger event for execution of the non-connected-state service is detected can be obtained, and a time interval between the time at which the trigger event for execution of the non-connected-state service is detected and a start time of the reception occasion is determined as the connected-state-service gap, where the connected-state-service gap is allocated to the first SIM card 101 for use.

For another example, on condition that the terminal device 10 completes in advance a non-connected-state service of reading SI1 via the second SIM card 102 in a reception occasion for the service of reading SI1, and does not complete a service of reading SI2, a time interval between a time at which the non-connected-state service of reading SI1 is completed and a start time of a last reception occasion for the service of reading SI2 is determined as the connected-state-service gap, where the connected-state-service gap is allocated to the first SIM card 101 for use.

In implementations of the disclosure, the terminal device 10 is allowable to execute the connected-state service via the first SIM card 101 in the connected-state-service gap. That is, the connected-state-service gap is allocated for execution of the connected-state service via the first SIM card 101 in the connected-state-service gap by the terminal device 10. The terminal device 10 can execute or does not execute the connected-state service via the first SIM card 101 in the connected-state-service gap. For example, in the case where the terminal device 10 currently has no need to execute the connected-state service, even if the connected-state-service gap is allocated to the first SIM card 101, the terminal device 10 also does not need to execute the connected-state service in the connected-state-service gap. For another example, in the case where the terminal device 10 currently has a need to execute the connected-state service, the terminal device 10 needs to execute the connected-state service in the connected-state-service gap.

The first SIM card 101 is subject to the connected-state-service gap and can merely be used to execute transmission and reception of the connected-state service in the connected-state-service gap. For example, after the connected-state-service gap allocated is obtained, a service arbitration module of the terminal device is notified to control the first SIM card 101 to be subject to the connected-state-service gap, and the first SIM card 101 is used for execution of transmission and reception of the connected-state service in the connected-state-service gap. After the non-connected-state service is completed, the service arbitration module of the terminal device is notified to control the first SIM card 101 to be not subject to the connected-state-service gap, and the first SIM card 101 can be used for execution of transmission and reception of the connected-state service according to a conventional connected-state scenario.

It needs to be noted that when the second SIM card 102 is in the connected state and the first SIM card 101 is in the non-connected state, operations similar or identical to the foregoing operations executed when the first SIM card 101 is in the connected state and the second SIM card 102 is in the non-connected state can be executed, which will not be repeated herein. The terminal device 10 includes, but is not limited to, an access terminal, a subscriber unit, a subscriber station, a mobile station (MS), a mobile platform, a remote station, a remote terminal, a mobile device, a user terminal, a terminal equipment, a wireless communication device, a user agent, or a user apparatus. The terminal device 10 may also be a cellular radio telephone, a cordless telephone, a session initiation protocol (SIP) telephone, a wireless local loop (WLL) station, or a personal digital assistant (PDA). The terminal device 10 may also be a device with wireless communication functions such as a handheld device, a computing device, other processing devices coupled with a wireless modem, an in-vehicle device, a wearable device, or a terminal device in other 4th generation (4G) networks, a terminal device in the future 5th generation (5G) network, a terminal device in a future evolved public land mobile network (PLMN), or devices with wireless communication functions.

Figure 2:
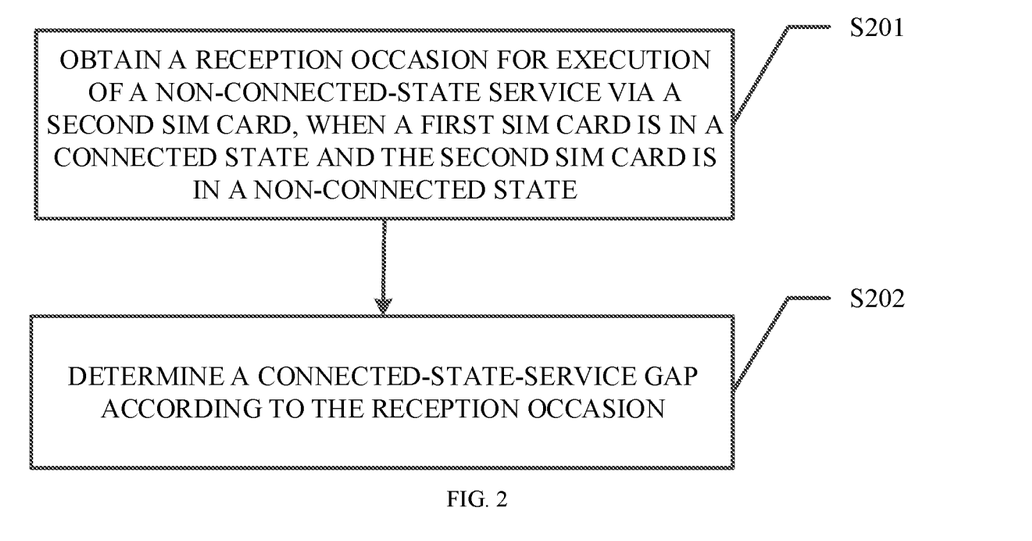
FIG. 2 is a schematic flow chart illustrating a method for communication processing provided in implementations of the disclosure.

Referring to FIG. 2, FIG. 2 is a schematic flow chart illustrating a method for communication processing provided in implementations of the disclosure. The specification provides operations of methods as described in implementations or flow charts, but more or fewer operations may be included based on conventional or uncreative labor. The order of operations listed in implementations is merely one of execution orders of many operations and does not represent the only one execution order. In fact, when executing, the terminal device or a storage medium product may execute the operations in an order of the method illustrated in implementations or in an order of the method illustrated in accompanying drawings, or may execute the operations in parallel. Specifically, as illustrated in FIG. 2, the method is applicable to a terminal device, where the terminal device is provided with a first SIM card and a second SIM card. The first SIM card and the second SIM card multiplex a hardware resource of the terminal device in a time-division manner. The method includes the following.

S201, obtain a reception occasion for execution of a non-connected-state service via the second SIM card, when the first SIM card is in a connected state and the second SIM card is in a non-connected state.

S202, determine a connected-state-service gap according to the reception occasion.

The terminal device is allowable to execute a connected-state service via the first SIM card in the connected-state-service gap.

In implementations of the disclosure, according to the reception occasion for the non-connected-state service, the terminal device flexibly allocates the connected-state-service gap to the SIM card in the connected state, thereby improving flexibility and accuracy of connected-state-service gap allocation and reducing a duration of interruption of the connected-state service.

Figure 3:
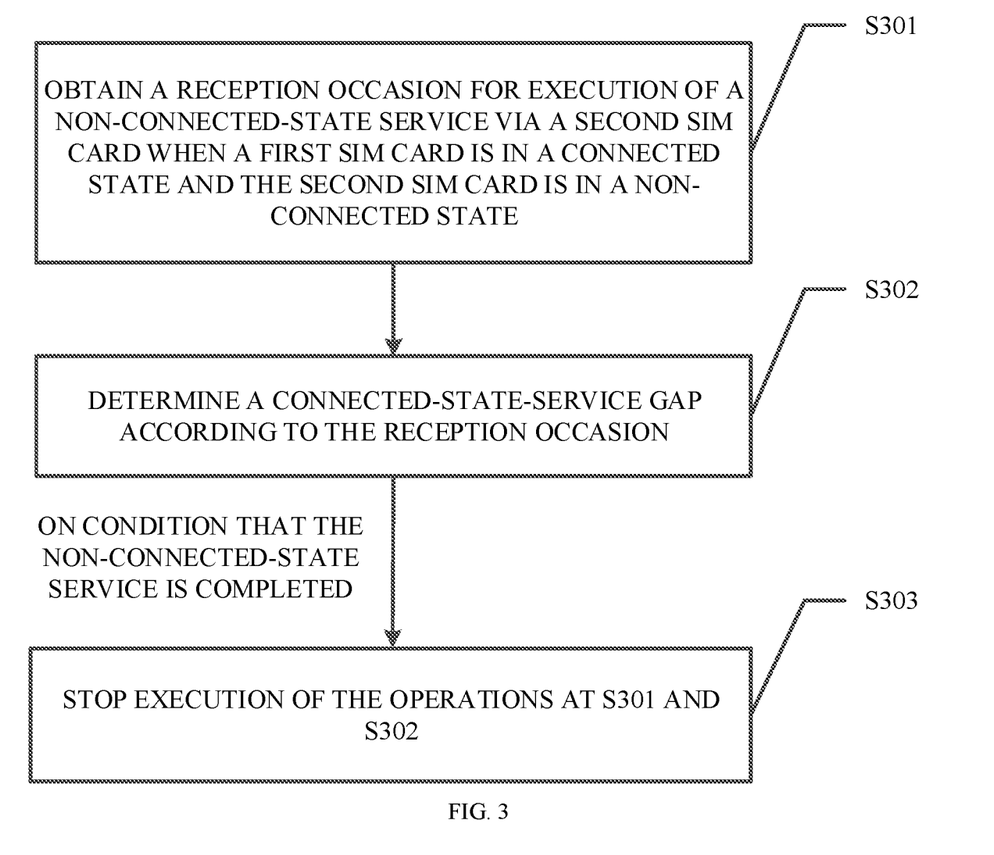
FIG. 3 is another schematic flow chart illustrating a method for communication processing provided in implementations of the disclosure.

Referring to FIG. 3, FIG. 3 is another schematic flow chart illustrating a method for communication processing provided in implementations of the disclosure. The specification provides operations of methods as described in implementations or flow charts, but more or fewer operations may be included based on conventional or uncreative labor. The order of operations listed in implementations is merely one of execution orders of many operations and does not represent the only one execution order. In fact, when executing, the terminal device or a storage medium product may execute the operations in an order of the method illustrated in implementations or in an order of the method illustrated in accompanying drawings, or may execute the operations in parallel. Specifically, as illustrated in FIG. 3, the method is applicable to a terminal device, where the terminal device is provided with a first SIM card and a second SIM card. The first SIM card and the second SIM card multiplex a hardware resource of the terminal device in a time-division manner. The method includes the following.

S301, obtain a reception occasion for execution of a non-connected-state service via the second SIM card, when the first SIM card is in a connected state and the second SIM card is in a non-connected state.

In implementations of the disclosure, obtain the reception occasion for execution of the non-connected-state service via the second SIM card as follows. Obtain a last reception occasion for a target non-connected-state service, where the target non-connected-state service is a non-connected-state service that is determined as uncompleted.

The last reception occasion is later than the current time. For example, at the current time, execution of the non-connected-state service is detected, and the last reception occasion is later than the time at which execution of the non-connected-state service is detected. For another example, the non-connected-state service includes a first service and a second service, at the current time, the first service is completed, and the last reception occasion is a reception occasion for the second service, where the reception occasion is later than the time at which the first service is completed, and the second service is not completed.

The non-connected-state service that is determined as uncompleted refers to a non-connected-state service, execution of which has not yet been started, or a non-connected-state service that has been partially executed but is not completed.

In implementations of the disclosure, on condition that a trigger event for execution of the non-connected-state service is detected, a reception occasion closest to a first time is obtained, where the first time is a time at which the trigger event for execution of the non-connected-state service is detected, and the reception occasion closest to the first time is later than the first time.

The time at which the trigger event for execution of the non-connected-state service is detected may be a time at which an instruction for execution of the non-connected-state service is received, or a time at which the non-connected-state service is determined to be executed, after the received instruction for execution of the non-connected-state service is processed and analyzed.

In implementations of the disclosure, the non-connected-state service includes only the first service, or, the non-connected-state service includes both the first service and the second service.

In the case where the non-connected-state service includes the first service and the second service, there are two cases.

Case 1: the non-connected-state service includes only the first service and the second service.

Case 2: the non-connected-state service further includes, in addition to the first service, at least two services. The second service is one of the at least two services, where a reception occasion for the one of the at least two services is closest to a time at which the first service is completed; and/or, the second service is one of the at least two services, where a reception occasion for the one of the at least two services is closest to an end time of a reception occasion for the first service.

The reception occasion for the non-connected-state service may occur periodically in the case where the non-connected-state service is not completed. Reception occasions for different non-connected-state services may occur every different periods or every same period. For example, the non-connected-state service includes a service of reading SI1, a service of reading SI2, and a service of reading SI3, where a reception occasion for the service of reading SI1 occurs every 160 ms, and a reception occasion for the service of reading SI2 occurs every 640 ms. For another example, the reception occasion for the service of reading SI2 occurs every 160 ms, and a reception occasion for the service of reading SI3 occurs every 160 ms.

In implementations of the disclosure, in the case where the non-connected-state service includes the first service and the second service, upon detecting that the first service is completed, e.g., upon detecting that the first service is completed in a current reception occasion for the first service, and upon detecting that the second service is not completed, obtain a reception occasion for the second service closest to a time at which the first service is completed. The reception occasion for the second service closest to the time at which the first service is completed is later than the time at which the first service is completed.

In implementations of the disclosure, on condition that the non-connected-state service is not completed in a first reception occasion, obtain a second reception occasion closest to the first reception occasion. The second reception occasion closest to the first reception occasion is later than the first reception occasion.

The non-connected-state service being not completed in the first reception occasion means that a non-connected-state service corresponding to the first reception occasion is not completed in the first reception occasion, and the non-connected-state service corresponding to the first reception occasion needs to be completed in a subsequent reception occasion. For example, the non-connected-state service includes the first service, and the first service corresponds to the first reception occasion, i.e., the first reception occasion is used for execution of the first service. However, the first service is not completed in the first reception occasion, and thus it is necessary to continuously execute the first service in a subsequent reception occasion periodically allocated for execution of the first service.

In the case where the non-connected-state service includes only the first service, the second reception occasion corresponds to the first service, i.e., the second reception occasion is used for execution of the first service.

In the case where the non-connected-state service includes the first service and the second service, the second reception occasion corresponds to the first service or the second service, i.e., the second reception occasion is used for execution of the first service or execution of the second service. Whether the second reception occasion is for the first service or the second service is determined according to a period every which the reception occasion for the first service occurs, a time at which the reception occasion for the first service occurs first, a period every which the reception occasion for the second service occurs, and a time at which the reception occasion for the second service occurs first.

S302, determine a connected-state-service gap according to the reception occasion.

The terminal device is allowable to execute a connected-state service via the first SIM card in the connected-state-service gap.

In implementations of the disclosure, determine the connected-state-service gap according to the reception occasion as follows. Determine a first time interval between a first time and a second time as the connected-state-service gap, upon detecting a trigger event for execution of the non-connected-state service. The first time is a time at which the trigger event for execution of the non-connected-state service is detected, the second time is a start time of a reception occasion closest to the first time, and the first time is earlier than the second time.

Figure 4:
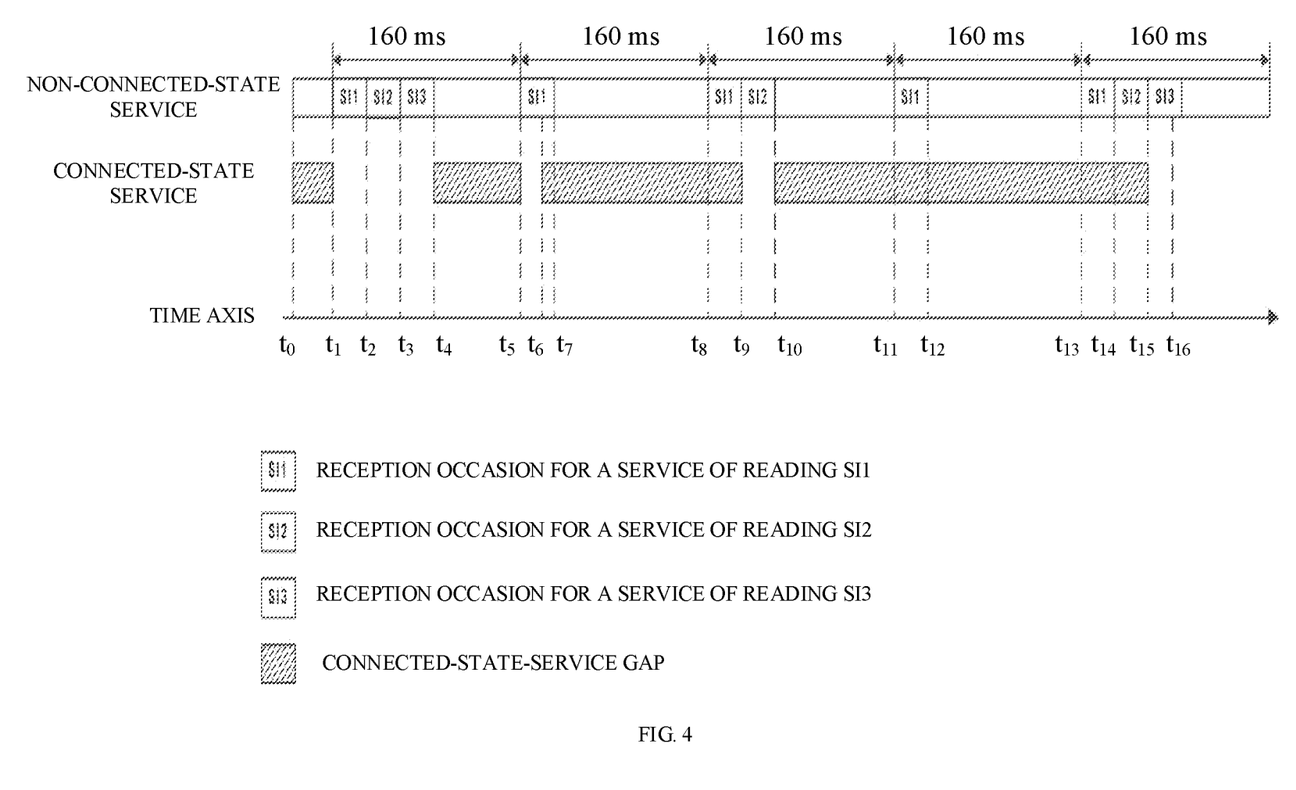
FIG. 4 is a schematic diagram illustrating connected-state-service gap allocation provided in implementations of the disclosure.

Referring to FIG. 4, FIG. 4 is a schematic diagram illustrating connected-state-service gap allocation provided in implementations of the disclosure. Specifically, as illustrated in FIG. 4, a trigger event for execution of a non-connected-state service is detected at t0, the non-connected-state service is a service of reading SI, including three services such as a service of reading SI1, a service of reading SI2, and a service of reading SI3. A reception occasion for the service of reading SI1 occurs every 160 ms, a reception occasion for the service of reading SI2 occurs every 320 ms, and a reception occasion for the service of reading SI3 occurs every 640 ms. A first time interval between t0 and t1 is determined as a first connected-state-service gap and allocated to the first SIM card for use. t1 is a starting point of a time that is integer multiple of 640 ms, and indicates a start time of a reception occasion for the non-connected-state service (the service of reading SI1) closest to t0.

In implementations of the disclosure, determine the connected-state-service gap according to the reception occasion as follows. Determine a start time of the connected-state-service gap according to the reception occasion and an execution status of the non-connected-state service. Determining the connected-state-service gap according to the start time.

The execution status of the non-connected-state service includes a status in which the non-connected-state service is completed and a status in which the non-connected-state service is not completed. The status in which the non-connected-state service is not completed includes a status in which execution of the non-connected-state service has not been started and a status in which the non-connected-state service is partially executed.

In implementations of the disclosure, determine the start time of the connected-state-service gap according to the reception occasion and the execution status of the non-connected-state service as follows. Determine the start time of the connected-state-service gap as a third time, upon detecting that the first service is completed and the second service is not completed. The third time is a time at which completion of the first service is detected.

It needs to be noted that in such case, a second time interval between the third time and a reception occasion for the second service closest to the third time is determined as the connected-state-service gap. In the case where the third time coincides with a start time of the reception occasion for the second service closest to the third time or there is no time interval between the third time and the start time of the reception occasion for the second service closest to the third time, no connected-state-service gap is determined, and the second service is continuously executed.

In implementations of the disclosure, determine the connected-state-service gap according to the start time as follows. Determine a second time interval between the third time and a fourth time as the connected-state-service gap. The fourth time is a start time of a reception occasion for the second service closest to the third time, and the third time is earlier than the fourth time.

In implementations of the disclosure, the third time is between a start time of a reception occasion for the first service and an end time of the reception occasion for the first service.

The reception occasion for the first service may have one or more reception occasions periodically occurring, and there are two cases where the third time is in the same reception occasion for the first service.

The first case: the first time is later than the start time of the reception occasion for the first service and earlier than the end time of that reception occasion.

Specifically, as illustrated in FIG. 4, the service of reading SI1 is not completed in a first reception occasion for the service of reading SI1, and the service of reading SI1 is completed in a second reception occasion for the service of reading SI1. The service of reading SI2 is not completed in a first reception occasion for the service of reading SI2, and the service of reading SI3 is not completed in a first reception occasion for the service of reading SI3. A second reception occasion for the service of reading SI2 is closest to the third time t6 at which the service of reading SI1 is completed, so that the second service is the service of reading SI2 in the case where the first service is the service of reading SI1. The third time t6 at which the service of reading SI1 is completed is earlier than an end time of the second reception occasion for the service of reading SI1, and a start time (the fourth time) of the second reception occasion for the service of reading SI2 is t9, and the second time interval between t6 and t9 is determined as the connected-state-service gap.

The second case: the first time coincides with the end time of the reception occasion for the first service.

Specifically, as illustrated in FIG. 4, the service of reading SI2 is not completed in the first reception occasion for the service of reading SI2, and the service of reading SI3 is not completed in the first reception occasion for the service of reading SI3. The service of reading SI2 is completed in the second reception occasion for the service of reading SI2, and a time t10 at which the service of reading SI2 is completed coincides with an end time of the second reception occasion for the service of reading SI2. In this case, for the service of reading SI3 that is not completed, a start time t15 of a second reception occasion for the service of reading SI3 is closest to the time t10 at which the service of reading SI2 is completed, and thus the second service is the service of reading SI3 in the case where the first service is the service of reading SI2. The second time interval between the time t10 at which the service of reading SI2 is completed and the start time t15 of the second reception occasion for the service of reading SI3 is determined as the connected-state-service gap.

In implementations of the disclosure, determine the start time of the connected-state-service gap according to the reception occasion and the execution status of the non-connected-state service as follows. Determine the start time of the connected-state-service gap as an end time of a first reception occasion, on condition that the non-connected-state service is not completed in the first reception occasion.

In implementations of the disclosure, determine the connected-state-service gap according to the start time as follows. Determine a third time interval between the end time of the first reception occasion and a start time of a second reception occasion as the connection-state-service gap. The second reception occasion is a reception occasion for the non-connected-state service closest to the first reception occasion, and the first reception occasion is earlier than the second reception occasion.

In the case where the non-connected-state service includes only the first service, the first reception occasion and the second reception occasion each are the reception occasion for the first service and used for execution of the first service.

In the case where the non-connected-state service includes the first service and the second service, there are two cases in which the first reception occasion and the second reception occasion correspond to the non-connected-state service.

Case A: in the case where the first reception occasion is the reception occasion for the first service, on condition that a reception occasion (a start time of the reception occasion) closest to the first reception occasion (the end time of the first reception occasion) is the reception occasion for the first service, the second reception occasion is the reception occasion for the first service and used to continuously execute an uncompleted content of the first service.

Case B: in the case where the first reception occasion is the reception occasion for the first service, on condition that the reception occasion (the start time of the reception occasion) closest to the first reception occasion (the end time of the first reception occasion) is the reception occasion for the second service, the second reception occasion is the reception occasion for the second service and used for execution of the second service.

Specifically, as illustrated in FIG. 4, the first service is the service of reading SI3, and the service of reading SI3 is not completed in the first reception occasion for the service of reading SI3. The second reception occasion (a start time t5 of the second reception occasion) for the service of reading SI1 is closest to the first reception occasion (an end time t4 of the first reception occasion) for the service of reading SI3, and the service of reading SI1 is not completed in the first reception occasion for the service of reading SI1. The third time interval between t4 and t5 is determined as the connected-state-service gap.

On condition that the non-connected-state service is completed, execute an operation at S303.

Specifically, as illustrated in FIG. 4, the service of reading of SI1 is completed at t6, the service of reading of SI2 is completed at t10, and the service of reading of SI3 is completed at t16. That is, the non-connected-state service is completed at t16, and execute the operation at S303 after t16.

S303, stop execution of the operations at S301 and S302.

After stopping execution of the operations at S301 and S302, on condition that the terminal device has a connected-state service to be executed, the terminal device automatically executes the connected-state service via the first SIM card without considering the execution requirements of the non-connected-state service. For example, the terminal device can execute the connected-state service according to a conventional connected-state scenario without further reference to the connected-state-service gap.

In implementations of the disclosure, a time interval between the current time (the time at which the trigger event for execution of the non-connected-state service is detected) and the last reception occasion for the service (the non-connected-state service) of the SIM card in the non-connected state can be allocated to the SIM card in the connected state. Then the SIM card in the connected state can be used for execution of the connected-state service in the time interval, and thus flexible and variable reception occasions for the non-connected-state service can be adapted.

In implementations of the disclosure, the reception occasion for the non-connected-state service can be ended in advance according to an execution condition of the service (the non-connected-state service) of the SIM card in the non-connected state. A time interval between a time at which part of the non-connected-state service (the first service) is completed and a last reception occasion for an uncompleted non-connected-state service (the second service) is allocated to the SIM card in the connected state, according to the execution condition of the service (the non-connected-state service) of the SIM card in the non-connected state, for execution of the connected-state service in the time interval via the SIM card in the connected state. Therefore, the reception occasion for the non-connected-state service can occupy the hardware resource of the terminal device according to needs.

In implementations of the disclosure, according to the reception occasion for the non-connected-state service, the terminal device flexibly allocates the connected-state-service gap to the SIM card in the connected state, thereby improving flexibility and accuracy of connected-state-service gap allocation and reducing a duration of interruption of the connected-state service.

Figure 5:
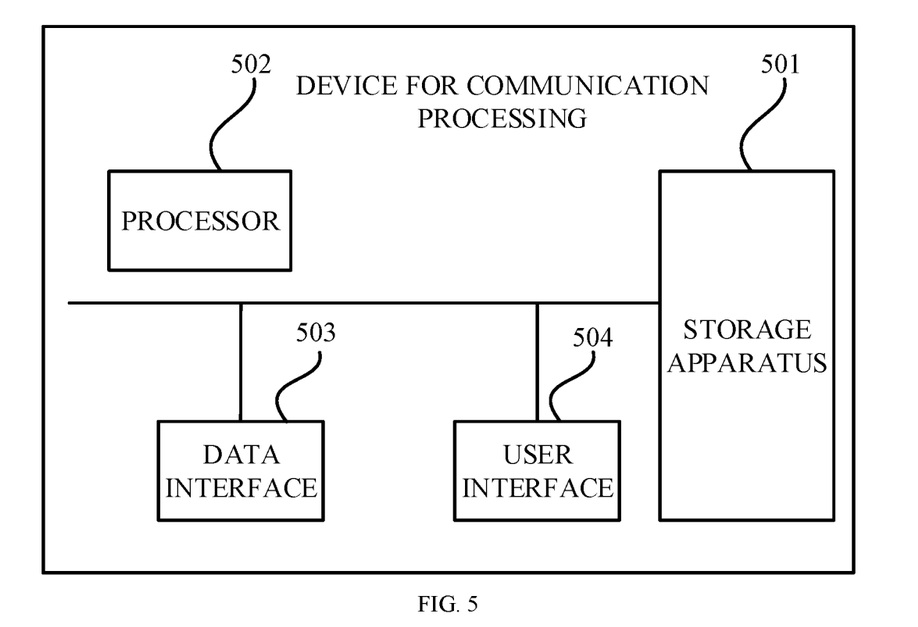
FIG. 5 is a schematic structural diagram of a device for communication processing provided in implementations of the disclosure.

Referring to FIG. 5, FIG. 5 is a schematic structural diagram of a device for communication processing provided in implementations of the disclosure. Specifically, as illustrated in FIG. 5, the device for communication processing includes a storage apparatus 501 and a processor 502. The device for communication processing may further include a data interface 503 and a user interface 504. Connections may be established between various hardware through various types of buses.

The device for communication processing can interact data with other terminal devices, servers, and other devices through the data interface 503. The user interface 504 is configured to achieve human-computer interaction between a user and the device for communication processing. The user interface 504 can provide a touch display, a physical key, and the like to achieve human-computer interaction between the user and the device for communication processing.

The storage apparatus 501 may include a volatile memory such as a random-access memory (RAM). The storage apparatus 501 may also include a non-volatile memory such as a flash memory, a solid-state drive (SSD), etc. The storage apparatus 501 may also include a combination of the above types of memories.

The processor 502 may be a central processing unit (CPU). The processor 502 may further include a hardware chip. The hardware chip may be an application-specific integrated circuit (ASIC), a programmable logic device (PLD), etc. The PLD may be a field-programmable gate array (FPGA), a generic array logic (GAL), etc.

The device for communication processing is applicable to a terminal device, where the terminal device is provided with a first SIM card and a second SIM card. The first SIM card and the second SIM card multiplex a hardware resource of the terminal device in a time-division manner. The storage apparatus 501 is configured to store program codes. The processor 502, when invoking the stored codes, is configured to: obtain a reception occasion for execution of a non-connected-state service via the second SIM card, when the first SIM card is in a connected state and the second SIM card is in a non-connected state; and determine a connected-state-service gap according to the reception occasion. The terminal device is allowable to execute a connected-state service via the first SIM card in the connected-state-service gap.

In an implementation, the processor 502 is specifically configured to obtain a last reception occasion for a target non-connected-state service, where the target non-connected-state service is a non-connected-state service that is determined as uncompleted.

In an implementation, the processor 502 is specifically configured to determine a first time interval between a first time and a second time as the connected-state-service gap, upon detecting a trigger event for execution of the non-connected-state service. The first time is a time at which the trigger event for execution of the non-connected-state service is detected, the second time is a start time of a reception occasion closest to the first time, and the first time is earlier than the second time.

In an implementation, the processor 502 is specifically configured to: determine a start time of the connected-state-service gap according to the reception occasion and an execution status of the non-connected-state service; and determine the connected-state-service gap according to the start time.

In an implementation, the non-connected-state service includes a first service and a second service. The processor 502 is specifically configured to determine the start time of the connected-state-service gap as a third time, upon detecting that the first service is completed and the second service is not completed. The third time is a time at which completion of the first service is detected.

In an implementation, the processor 502 is specifically configured to determine a second time interval between the third time and a fourth time as the connected-state-service gap. The fourth time is a start time of a reception occasion for the second service closest to the third time, and the third time is earlier than the fourth time.

In an implementation, the third time is between a start time of a reception occasion for the first service and an end time of the reception occasion for the first service.

In an implementation, the processor 502 is specifically configured to determine the start time of the connected-state-service gap as an end time of a first reception occasion, on condition that the non-connected-state service is not completed in the first reception occasion.

In an implementation, the processor 502 is specifically configured to determine a third time interval between the end time of the first reception occasion and a start time of a second reception occasion as the connection-state-service gap. The second reception occasion is a reception occasion for the non-connected-state service closest to the first reception occasion, and the first reception occasion is earlier than the second reception occasion.

Figure 6:
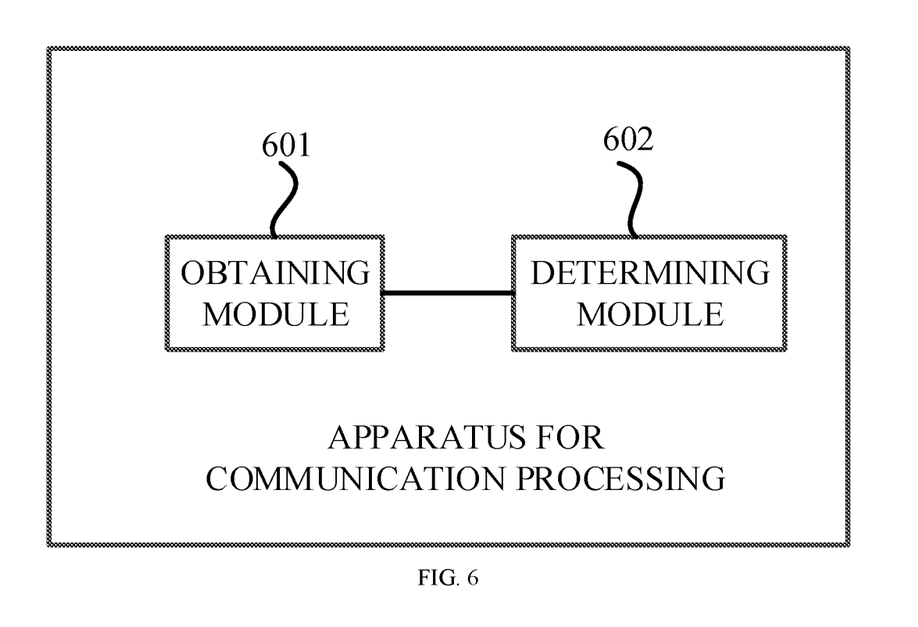
FIG. 6 is a schematic structural diagram of an apparatus for communication processing provided in implementations of the disclosure.

Referring to FIG. 6, FIG. 6 is a schematic structural diagram of an apparatus for communication processing provided in implementations of the disclosure. Specifically, as illustrated in FIG. 6, the apparatus for communication processing is applicable to a terminal device, where the terminal device is provided with a first SIM card and a second SIM card. The first SIM card and the second SIM card multiplex a hardware resource of the terminal device in a time-division manner. The apparatus for communication processing includes an obtaining module 601 and a determining module 602. The obtaining module 601 is configured to obtain a reception occasion for execution of a non-connected-state service via the second SIM card, when the first SIM card is in a connected state and the second SIM card is in a non-connected state. The determining module 602 is configured to determine a connected-state-service gap according to the reception occasion. The terminal device is allowable to execute a connected-state service via the first SIM card in the connected-state-service gap.

In an implementation, the obtaining module 601 is specifically configured to obtain a last reception occasion for a target non-connected-state service, where the target non-connected-state service is a non-connected-state service that is determined as uncompleted.

In an implementation, the determining module 602 is specifically configured to determine a first time interval between a first time and a second time as the connected-state-service gap, upon detecting a trigger event for execution of the non-connected-state service. The first time is a time at which the trigger event for execution of the non-connected-state service is detected, the second time is a start time of a reception occasion closest to the first time, and the first time is earlier than the second time.

In an implementation, the determining module 602 is specifically configured to: determine a start time of the connected-state-service gap according to the reception occasion and an execution status of the non-connected-state service; and determine the connected-state-service gap according to the start time.

In an implementation, the non-connected-state service includes a first service and a second service. The determining module 602 is specifically configured to determine the start time of the connected-state-service gap as a third time, upon detecting that the first service is completed and the second service is not completed. The third time is a time at which completion of the first service is detected.

In an implementation, the determining module 602 is specifically configured to determine a second time interval between the third time and a fourth time as the connected-state-service gap. The fourth time is a start time of a reception occasion for the second service closest to the third time, and the third time is earlier than the fourth time.

In an implementation, the third time is between a start time of a reception occasion for the first service and an end time of the reception occasion for the first service.

In an implementation, the determining module 602 is specifically configured to determine the start time of the connected-state-service gap as an end time of a first reception occasion, on condition that the non-connected-state service is not completed in the first reception occasion.

In an implementation, the determining module 602 is specifically configured to determine a third time interval between the end time of the first reception occasion and a start time of a second reception occasion as the connection-state-service gap. The second reception occasion is a reception occasion for the non-connected-state service closest to the first reception occasion, and the first reception occasion is earlier than the second reception occasion.

Accordingly, a computer-readable storage medium is further provided in implementations of the disclosure. The computer-readable storage medium is configured to store computer programs which enable a computer to perform the method described in any one of the implementations in the operations at S201 to S202 and the operations at S301 to S303 of the disclosure. It can be understood that the computer-readable storage medium herein may include a built-in storage medium in a smart terminal device, and may also include an extended storage medium supported by the smart terminal device. The computer-readable storage medium provides a storage space in which an operating system of the smart terminal device is stored. Moreover, one or more instructions suitable for loading and execution by a processor are stored in the storage space, where these instructions may be one or more computer programs (including program codes). It needs to be noted that the computer-readable storage medium herein may be a high-speed RAM or a non-volatile memory. For example, the non-volatile memory may be at least one disk memory or may also be at least one computer storage medium located away from the processor.

Accordingly, a chip is further provided in implementations of the disclosure. The chip is applicable to a terminal device, where the terminal device is provided with a first SIM card and a second SIM card. The first SIM card and the second SIM card multiplex a hardware resource of the terminal device in a time-division manner. The chip is configured to: obtain a reception occasion for execution of a non-connected-state service via the second SIM card, when the first SIM card is in a connected state and the second SIM card is in a non-connected state; and determine a connected-state-service gap according to the reception occasion. The terminal device is allowable to execute a connected-state service via the first SIM card in the connected-state-service gap.

In an implementation, the chip configured to obtain the reception occasion for execution of the non-connected-state service via the second SIM card is specifically configured to obtain a last reception occasion for a target non-connected-state service, where the target non-connected-state service is a non-connected-state service that is determined as uncompleted.

In an implementation, the chip configured to determine the connected-state-service gap according to the reception occasion is specifically configured to determine a first time interval between a first time and a second time as the connected-state-service gap, upon detecting a trigger event for execution of the non-connected-state service. The first time is a time at which the trigger event for execution of the non-connected-state service is detected, the second time is a start time of a reception occasion closest to the first time, and the first time is earlier than the second time.

In an implementation, the chip configured to determine the connected-state-service gap according to the reception occasion is specifically configured to: determine a start time of the connected-state-service gap according to the reception occasion and an execution status of the non-connected-state service; and determine the connected-state-service gap according to the start time.

In an implementation, the non-connected-state service includes a first service and a second service. The chip configured to determine the start time of the connected-state-service gap according to the reception occasion and the execution status of the non-connected-state service is specifically configured to determine the start time of the connected-state-service gap as a third time, upon detecting that the first service is completed and the second service is not completed. The third time is a time at which completion of the first service is detected.

In an implementation, the chip configured to determine the connected-state-service gap according to the start time is specifically configured to determine a second time interval between the third time and a fourth time as the connected-state-service gap. The fourth time is a start time of a reception occasion for the second service closest to the third time, and the third time is earlier than the fourth time.

In an implementation, the third time is between a start time of a reception occasion for the first service and an end time of the reception occasion for the first service.

In an implementation, the chip configured to determine the start time of the connected-state-service gap according to the reception occasion and the execution status of the non-connected-state service is specifically configured to determine the start time of the connected-state-service gap as an end time of a first reception occasion, on condition that the non-connected-state service is not completed in the first reception occasion.

In an implementation, the chip configured to determine the connected-state-service gap according to the start time is specifically configured to determine a third time interval between the end time of the first reception occasion and a start time of a second reception occasion as the connection-state-service gap. The second reception occasion is a reception occasion for the non-connected-state service closest to the first reception occasion, and the first reception occasion is earlier than the second reception occasion.

It needs to be noted that the chip can perform the relevant operations performed by the terminal device in the method implementations illustrated in FIG. 2 and FIG. 3. Specifically, reference can be made to the implementations provided in each of the above operations, which will not be repeated herein.

In an implementation, the chip includes at least one processor, at least one first memory, and at least one second memory. The at least one first memory and the at least one processor are interconnected via a line, and the first memory is configured to store instructions. The at least one second memory and the at least one processor are interconnected via a line, and the second memory is configured to store data that is required to be stored in the foregoing method implementations.

For each apparatus and product applied to or integrated in the chip, each module included can be implemented by hardware such as circuits, or at least part of modules can be implemented by software programs that run on a processor integrated in the chip, and the rest (if any) of modules can be implemented by hardware such as circuits.

Figure 7:
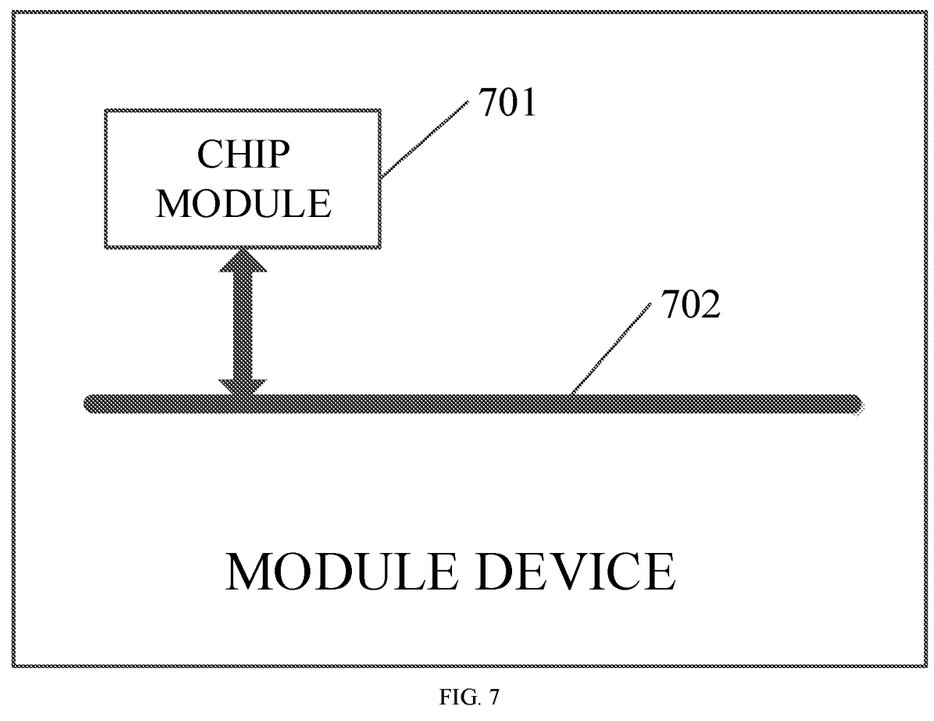
FIG. 7 is a schematic structural diagram of a module device provided in implementations of the disclosure.

Referring to FIG. 7, FIG. 7 is a schematic structural diagram of a module device provided in implementations of the disclosure. The module device is applicable to a terminal device, where the terminal device is provided with a first SIM card and a second SIM card. The first SIM card and the second SIM card multiplex a hardware resource of the terminal device in a time-division manner. The module device includes a chip module 701. The chip module 701 is configured to: obtain a reception occasion for execution of a non-connected-state service via the second SIM card when the first SIM card is in a connected state and the second SIM card is in a non-connected state; and determine a connected-state-service gap according to the reception occasion. The terminal device is allowable to execute a connected-state service via the first SIM card in the connected-state-service gap.

In an implementation, the chip module 701 configured to obtain the reception occasion for execution of the non-connected-state service via the second SIM card is specifically configured to obtain a last reception occasion for a target non-connected-state service, where the target non-connected-state service is a non-connected-state service that is determined as uncompleted.

In an implementation, the chip module 701 configured to determine the connected-state-service gap according to the reception occasion is specifically configured to determine a first time interval between a first time and a second time as the connected-state-service gap, upon detecting a trigger event for execution of the non-connected-state service. The first time is a time at which the trigger event for execution of the non-connected-state service is detected, the second time is a start time of a reception occasion closest to the first time, and the first time is earlier than the second time.

In an implementation, the chip module 701 configured to determine the connected-state-service gap according to the reception occasion is specifically configured to: determine a start time of the connected-state-service gap according to the reception occasion and an execution status of the non-connected-state service; and determine the connected-state-service gap according to the start time.

In an implementation, the non-connected-state service includes a first service and a second service. The chip module 701 configured to determine the start time of the connected-state-service gap according to the reception occasion and the execution status of the non-connected-state service is specifically configured to determine the start time of the connected-state-service gap as a third time, upon detecting that the first service is completed and the second service is not completed. The third time is a time at which completion of the first service is detected.

In an implementation, the chip module 701 configured to determine the connected-state-service gap according to the start time is specifically configured to determine a second time interval between the third time and a fourth time as the connected-state-service gap. The fourth time is a start time of a reception occasion for the second service closest to the third time, and the third time is earlier than the fourth time.

In an implementation, the third time is between a start time of a reception occasion for the first service and an end time of the reception occasion for the first service.

In an implementation, the chip module 701 configured to determine the start time of the connected-state-service gap according to the reception occasion and the execution status of the non-connected-state service is specifically configured to determine the start time of the connected-state-service gap as an end time of a first reception occasion, on condition that the non-connected-state service is not completed in the first reception occasion.

In an implementation, the chip module 701 configured to determine the connected-state-service gap according to the start time is specifically configured to determine a third time interval between the end time of the first reception occasion and a start time of a second reception occasion as the connection-state-service gap. The second reception occasion is a reception occasion for the non-connected-state service closest to the first reception occasion, and the first reception occasion is earlier than the second reception occasion.

In implementations of the disclosure, the module device may further include a communication interface (not illustrated in FIG. 7). The specific connection medium between the communication interface and the chip module 701 is not limited in implementations of the disclosure. In implementations of the disclosure, as illustrated in FIG. 7, the communication interface and the chip module 701 are connected via a bus 702, where the bus 702 is represented by a thick line in FIG. 7. The way of connection between other components is only for schematic illustration and not cited as a limit. The bus 702 can be classified into an address bus, a data bus, a control bus, etc. For the convenience of illustration, only one thick line is used to represent the bus 702 in FIG. 7, which does not mean that there is only one bus or one type of bus.

The above implementations are only a part implementations of the disclosure, and the above implementations cannot limit the scope of the disclosure. The ordinary skill in the field can understand all or a part of the process that realizes the above implementations of the disclosure, and equivalent changes made in accordance with the claims of the disclosure still belong to the scope of the disclosure.

What is claimed is:

1. A method for communication processing, applicable to a terminal device, the terminal device being provided with a first subscriber identity module (SIM) card and a second SIM card, the first SIM card and the second SIM card multiplexing a hardware resource of the terminal device in a time-division manner, and the method comprising:
when the first SIM card is in a connected state and the second SIM card is in a non-connected state, obtaining a reception occasion for execution of a non-connected-state service via the second SIM card; and
determining a connected-state-service gap according to the reception occasion, wherein
the terminal device is allowable to execute a connected-state service via the first SIM card in the connected-state-service gap;
wherein determining the connected-state-service gap according to the reception occasion comprises:
determining a start time of the connected-state-service gap according to the reception occasion and an execution status of the non-connected-state service; and
determining the connected-state-service gap according to the start time;
wherein the non-connected-state service comprises a first service and a second service; and determining the start time of the connected-state-service gap according to the reception occasion and the execution status of the non-connected-state service comprises:
  determining the start time of the connected-state-service gap as a third time, upon detecting that the first service is completed and the second service is not completed, wherein the third time is a time at which completion of the first service is detected.

2. The method of claim 1, wherein obtaining the reception occasion for execution of the non-connected-state service via the second SIM card comprises:
  obtaining a last reception occasion for a target non-connected-state service, wherein the target non-connected-state service is a non-connected-state service that is determined as uncompleted.

3. The method of claim 1, wherein determining the connected-state-service gap according to the reception occasion comprises:
  upon detecting a trigger event for execution of the non-connected-state service, determining a first time interval between a first time and a second time as the connected-state-service gap, wherein
  the first time is a time at which the trigger event for execution of the non-connected-state service is detected, the second time is a start time of a reception occasion closest to the first time, and the first time is earlier than the second time.

4. The method of claim 1, wherein determining the connected-state-service gap according to the start time comprises:
  determining a second time interval between the third time and a fourth time as the connected-state-service gap, wherein
  the fourth time is a start time of a reception occasion for the second service closest to the third time, and the third time is earlier than the fourth time.

5. The method of claim 1, wherein the third time is between a start time of a reception occasion for the first service and an end time of the reception occasion for the first service.

6. The method of claim 1, wherein determining the start time of the connected-state-service gap according to the reception occasion and the execution status of the non-connected-state service comprises: on condition that the non-connected-state service is not completed in a first reception occasion, determining the start time of the connected-state-service gap as an end time of the first reception occasion.

7. The method of claim 6, wherein determining the connected-state-service gap according to the start time comprises:
  determining a third time interval between the end time of the first reception occasion and a start time of a second reception occasion as the connection-state-service gap, wherein
  the second reception occasion is a reception occasion for the non-connected-state service closest to the first reception occasion, and the first reception occasion is earlier than the second reception occasion.

8. A terminal device, the terminal device being provided with a first subscriber identity module (SIM) card and a second SIM card, the first SIM card and the second SIM card multiplexing a hardware resource of the terminal device in a time-division manner, and the terminal device comprising:
  a processor; and
  a memory storing a computer program which, when executed by the processor, causes the terminal device to:
    obtain a reception occasion for execution of a non-connected-state service via the second SIM card, when the first SIM card is in a connected state and the second SIM card is in a non-connected state; and
    determine a connected-state-service gap according to the reception occasion, wherein
    the terminal device is allowable to execute a connected-state service via the first SIM card in the connected-state-service gap;
  wherein the computer program executed by the processor to cause the terminal device to determine the connected-state-service gap according to the reception occasion is executed by the processor to cause the terminal device to:
    determine a start time of the connected-state-service gap according to the reception occasion and an execution status of the non-connected-state service; and
    determine the connected-state-service gap according to the start time;
  wherein the non-connected-state service comprises a first service and a second service; and
  the computer program executed by the processor to cause the terminal device to determine the start time of the connected-state-service gap according to the reception occasion and the execution status of the non-connected-state service is executed by the processor to cause the terminal device to:
    determine the start time of the connected-state-service gap as a third time, upon detecting that the first service is completed and the second service is not completed, wherein the third time is a time at which completion of the first service is detected.

9. The terminal device of claim 8, wherein the computer program executed by the processor to cause the terminal device to obtain the reception occasion for execution of the non-connected-state service via the second SIM card is executed by the processor to cause the terminal device to:
  obtain a last reception occasion for a target non-connected-state service, wherein the target non-connected-state service is a non-connected-state service that is determined as uncompleted.

10. The terminal device of claim 8, wherein the computer program executed by the processor to cause the terminal device to determine the connected-state-service gap according to the reception occasion is executed by the processor to cause the terminal device to:
  determine a first time interval between a first time and a second time as the connected-state-service gap, upon detecting a trigger event for execution of the non-connected-state service, wherein
  the first time is a time at which the trigger event for execution of the non-connected-state service is detected, the second time is a start time of a reception occasion closest to the first time, and the first time is earlier than the second time.

11. The terminal device of claim 8, wherein the computer program executed by the processor to cause the terminal device to determine the connected-state-service gap according to the start time is executed by the processor to cause the terminal device to:

determine a second time interval between the third time and a fourth time as the connected-state-service gap, wherein the fourth time is a start time of a reception occasion for the second service closest to the third time, and the third time is earlier than the fourth time.

12. The terminal device of claim 8, wherein the third time is between a start time of a reception occasion for the first service and an end time of the reception occasion for the first service.

13. The terminal device of claim 8, wherein the computer program is executed by the processor to cause the terminal device to determine the start time of the connected-state-service gap according to the reception occasion and the execution status of the non-connected-state service is executed by the processor to cause the terminal device to:

determining the start time of the connected-state-service gap as an end time of the first reception occasion, on condition that the non-connected-state service is not completed in a first reception occasion.

14. The terminal device of claim 13, wherein the computer program is executed by the processor to cause the terminal device to determine the connected-state-service gap according to the start time is executed by the processor to cause the terminal device to:

determine a third time interval between the end time of the first reception occasion and a start time of a second reception occasion as the connection-state-service gap, wherein the second reception occasion is a reception occasion for the non-connected-state service closest to the first reception occasion, and the first reception occasion is earlier than the second reception occasion.

15. A non-transitory computer-readable storage medium configured to store computer programs which enable a terminal device to:

obtain a reception occasion for execution of a non-connected-state service via the second SIM card, when the first SIM card is in a connected state and the second SIM card is in a non-connected state; and determine a connected-state-service gap according to the reception occasion, wherein the terminal device is allowable to execute a connected-state service via the first SIM card in the connected-state-service gap;

wherein the computer programs enabling the terminal device to determine the connected-state-service gap according to the reception occasion enables the terminal device to:

determine a start time of the connected-state-service gap according to the reception occasion and an execution status of the non-connected-state service; and determine the connected-state-service gap according to the start time;

wherein the non-connected-state service comprises a first service and a second service; and the computer program enabling the terminal device to determine the start time of the connected-state-service gap according to the reception occasion and the execution status of the non-connected-state service enables the terminal device to:

determine the start time of the connected-state-service gap as a third time, upon detecting that the first service is completed and the second service is not completed, wherein the third time is a time at which completion of the first service is detected.

16. The non-transitory computer-readable storage medium of claim 15, wherein the computer programs enabling the terminal device to obtain the reception occasion for execution of the non-connected-state service via the second SIM card enables the terminal device to:

obtain a last reception occasion for a target non-connected-state service, wherein the target non-connected-state service is a non-connected-state service that is determined as uncompleted.

* * * * *